(12) United States Patent
Kasuga (10) Patent No.: US 7,461,388 B2
(45) Date of Patent: Dec. 2, 2008

(54) OPTICAL DISK DEVICE

(75) Inventor: Kyoji Kasuga, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 351 days.

(21) Appl. No.: 11/225,372

(22) Filed: Sep. 12, 2005

(65) Prior Publication Data

US 2006/0080685 A1    Apr. 13, 2006

(30) Foreign Application Priority Data

Sep. 16, 2004    (JP) .............................. 2004-270219

(51) Int. Cl.
*G11B 17/03*    (2006.01)
(52) U.S. Cl. .................. 720/616; 720/601; 720/615
(58) Field of Classification Search ................. 720/601, 720/615, 616
See application file for complete search history.

(56) References Cited

U.S. PATENT DOCUMENTS

| | | | | |
|---|---|---|---|---|
| 5,933,400 A | * | 8/1999 | Kabasawa | 720/656 |
| 6,134,206 A | * | 10/2000 | Furukawa et al. | 720/628 |
| 6,473,382 B1 | * | 10/2002 | Tagawa et al. | 720/616 |
| 6,667,941 B2 | * | 12/2003 | Kabasawa | 720/635 |
| 2004/0205789 A1 | * | 10/2004 | Tsung-Jung | 720/619 |
| 2007/0101346 A1 | * | 5/2007 | Kasuga | 720/612 |

FOREIGN PATENT DOCUMENTS

| | | |
|---|---|---|
| JP | 5-33342 | 4/1993 |
| JP | 11259949 | 9/1999 |
| JP | 2000-156016 | 6/2000 |

* cited by examiner

*Primary Examiner*—William J. Kimowicz
*Assistant Examiner*—Carlos E Garcia
(74) *Attorney, Agent, or Firm*—David G. Conlin; David A. Tucker; Edwards Angell Palmer & Dodge LLP (57) ABSTRACT

An optical disk device including a tray in which recording mediums having differing outer diameters can be selectively mounted. The tray carries the recording media into the main body of the optical disk device wherein it is, chucked by a turntable. Holding members for holding the recording medium at a predetermined position relative to a mounting face of the tray are provided in a front portion and a rear portion respectively relative to the transport direction of the tray. At least one of the holding members is movable between a first holding position for holding a small diameter recording medium, and a second holding position for holding a large diameter recording medium. The holding member is biased toward the first holding position by a biasing member.

2 Claims, 10 Drawing Sheets

OPTICAL DISK DEVICE

CROSS REFERENCE TO RELATED APPLICATIONS

This application claims priority under 35 U.S.C. § 119(a) on Patent Application No. 2004-270219 filed in Japan on Sep. 16, 2004, the entire contents of which are hereby incorporated by reference.

BACKGROUND OF THE INVENTION

1. Field of Invention

The present invention relates to an optical disk device provided with a tray in which recording mediums with differing forms can be mounted such as a bare disk and a cartridge housing a disk.

2. Conventional Art

Conventionally, there is an optical disk device that includes a tray in which a cartridge housing a disk or a naked disk (a bare disk) can be selectively mounted. This tray mounts a bare disk or a cartridge and is loaded into the main body of the optical disk device. In approximately the center portion of this tray, a recess is formed for the purpose of mounting a bare disk. When using a bare disk, the bare disk is mounted on the bottom face of the recess of the tray. When mounting a cartridge, the cartridge is mounted on a cartridge mounting face that is formed on a circumferential face of the recess (for example, see Japanese Patent No. 3017723).

Figure 10A:
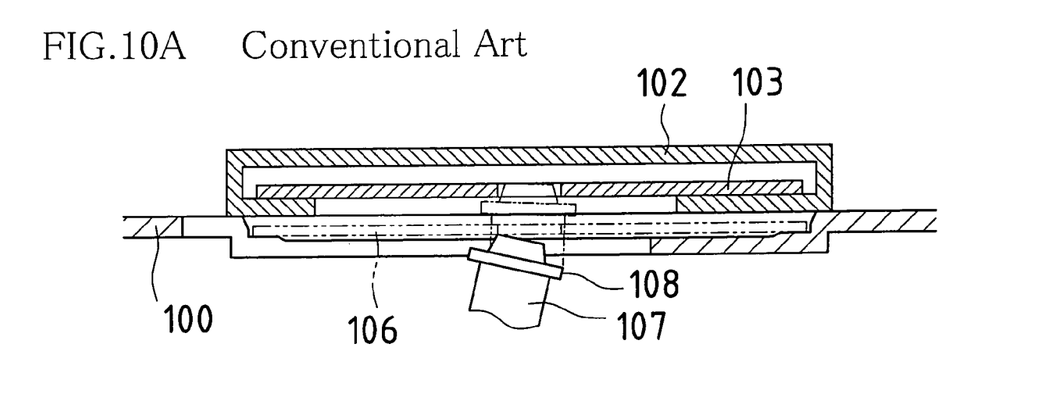
FIG. 10A is a cross-sectional diagram that shows the mounting position of the cartridge and the bare disk in the tray
Figure 10B:
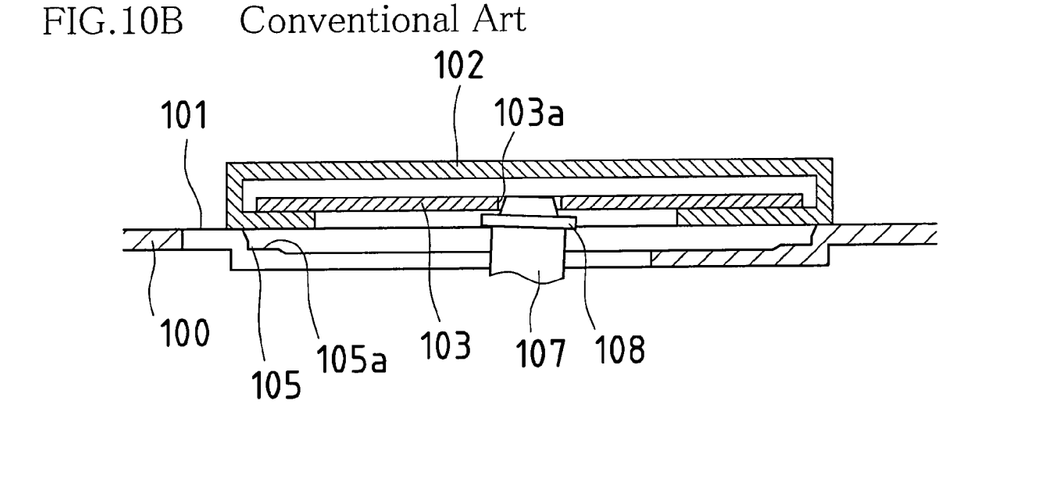
FIG. 10B is a cross-sectional diagram that shows how the cartridge is chucked.
Figure 10C:
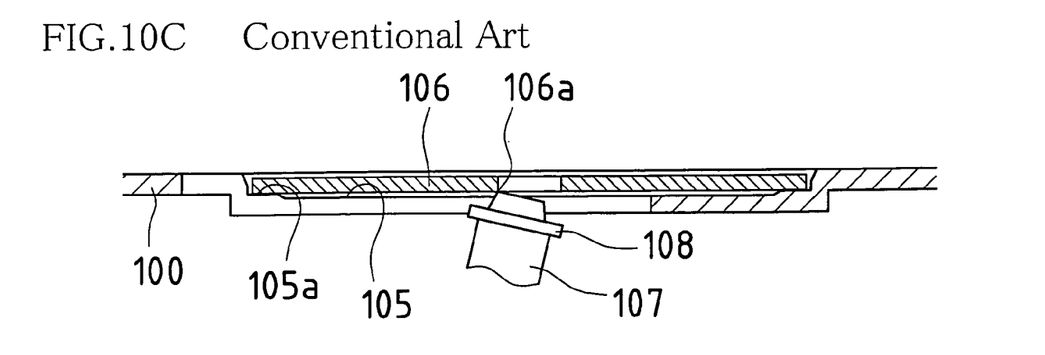
FIG. 10C is a cross-sectional diagram that shows how the bare disk is chucked.

A conventional tray is transported between an installation/removal position where it is possible to exchange disks outside of the main body of the device, and a recording/playback position where recording and playback of a disk completely inserted into the main body of the device are possible. In this recording/playback position, chucking is performed by fitting a turntable 108 that is rotated by a motor 107 to a center hole 103a of a disk 103 inside a cartridge 102 that has been mounted on a cartridge mounting face 101 of a tray 100 as shown in FIG. 10B, or a center hole 106a of a bare disk 106 that has been mounted on a recess 105 of the tray 100 as shown in FIG. 10C, and the respective disks are rotated.

Specifically, in order to hold the bare disk 106 such that positional shift of the bare disk 106 in the insertion direction of the tray 100 due to the transport operation is prevented, some amount of depth is necessary in the recess 105. However, in the tray 100 which can mount either the bare disk 106 or the cartridge 102, the difference in the heightwise position of the cartridge mounting face 101 and a bottom face 105a of the recess 105, which is the mounting face for the bare disk, is increased when the recess 105 is deepened (see FIG. 10A). Thus, there is an increase in the difference in height between the disk 103 in the cartridge 102 and the bare disk 106 when they are mounted in the tray 100, and there is a risk of a chucking error occurring when chucking each disk to the turntable 108.

Also, when increasing the depth of the recess 105, there is the problem that the entire device becomes thicker because the tray 100 must be manufactured with a thick size.

Moreover, when a recess has been provided in the tray as in the conventional technology, it is possible for the user to place the bare disk on a cartridge mounting face other than the recess, and when the disk has not been accurately placed on the recess, there is a risk of damaging the disk or the device due to a chucking error.

SUMMARY OF THE INVENTION

It is an object of the present invention to prevent chucking errors of recording mediums that have different forms such as a cartridge and a bare disk, and to make it possible to make the tray and the entire device thinner.

The present invention adopts a configuration as described below.

The optical disk device of the present invention includes a tray in which any of recording mediums with differing outer diameters such as a cartridge housing a disk and a bare disk can be selectively mounted, the device being configured such that by transporting the tray into the main body of the optical disk device, the recording medium mounted in the tray is made to be chucked by a turntable. Holding means that hold the recording medium at a predetermined position of a mounting face of the tray are provided in a front portion and a rear portion respectively in the transport direction of the tray, at least one of the holding means is configured so that a holding member can move to a first holding position where it is possible to hold a small diameter recording medium, and to a second holding position where it is possible to hold a large diameter recording medium, and the holding member is biased to the first holding position by a biasing means.

With an optical disk device having this sort of configuration, it is possible to hold desired forms of recording mediums that have different outer diameters at a predetermined position of the tray with the holding means. Accordingly, it is not necessary to provide a deep recess in the tray for a specific recording medium, and it becomes possible to make the tray and the device thinner. Also, because a positional shift does not occur during the operation of the tray, it is possible to accurately chuck the recording medium and good operability can be obtained.

Being able to hold a recording medium at a predetermined position in the tray refers to positioning the recording medium at a position where chucking is possible with the holding means.

Also, the optical disk device of the present invention, in which either one of a bare disk or a cartridge housing a disk, which are recording mediums with differing outer diameters, is mounted, may adopt a configuration in which holding means that hold the bare disk or the cartridge at a predetermined position of a mounting face of the tray are provided in a front portion and a rear portion respectively in the transport direction of the tray, at least one of the holding means is configured so that a holding member can move to a bare disk holding position where it is possible to hold a bare disk and to a cartridge holding position where it is possible to hold a cartridge, and the holding member is biased to the bare disk holding position by a biasing means.

With an optical disk device having this sort of configuration, it is possible to hold a bare disk or a cartridge at a chucking center with the holding means. Accordingly, it is not necessary to provide a deep recess in the tray for holding a bare disk, and it is possible to make the tray and the entire device thinner because the mounting face of the bare disk and the cartridge can be made flush.

Also, in the optical disk device, a configuration may be adopted in which the holding member can rotate along the bottom wall of the tray, and in addition, the holding member has a bare disk guide face with an inner diameter that is larger than the outer diameter of the bare disk, and an inclined face that is contacted by a rear angular portion of the cartridge when the holding member is in the bare disk holding position.

With an optical disk device having this sort of configuration, the holding member rotates, and because the holding member escapes in the direction of the face of the bottom wall of the tray by rotating, it is possible to prevent the tray and the entire device from increasing in thickness with the holding means.

Also, in the above optical disk device, it is preferable that the biasing force of the biasing means (the elastic force of an elastic member) is set to be a force such that when the rear portion of the bare disk has been placed on the inclined face of the holding member, the bare disk can slide along the inclined face due to the weight of the bare disk, and when the rear portion of the cartridge has been placed on the inclined face, the holding member can move in reverse due to the weight of the cartridge. In this case, even if the bare disk is placed in a position somewhat shifted from a predetermined position, the bare disk can be placed in the predetermined position by the bare disk shifting due to its own weight. Also, because the cartridge rotates the holding member to the cartridge holding position due to the weight of the cartridge, the cartridge can be mounted to a predetermined position, and it is possible to prevent damage to the disk or the device due to chucking errors.

BRIEF DESCRIPTION OF THE DRAWINGS

FIGS. 8A to 8C show cases in which a bare disk is mounted in the tray of an optical disk device according to the present invention.

FIGS. 9A to 9C show cases in which a cartridge is mounted in the tray of an optical disk device according to the present invention.

FIGS. 10A to 10C show a conventional example.

DESCRIPTION OF THE PREFERRED EMBODIMENTS

Hereinafter, an embodiment of the present invention will be described with reference to the accompanying drawings.

Figure 1:
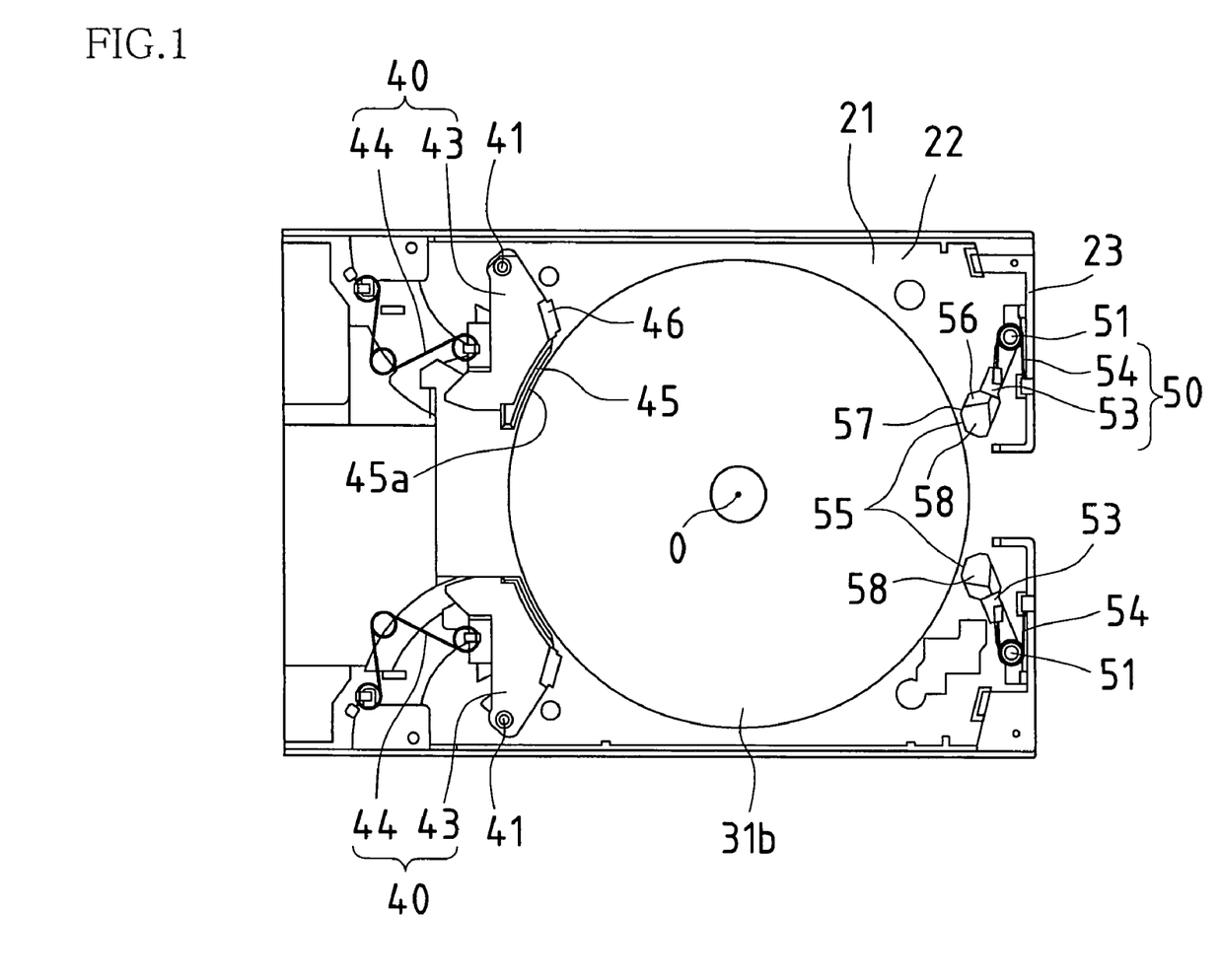
FIG. 1 is a plan view of a tray in which a bare disk has been mounted that shows an embodiment of an optical disk device according to the present invention.
Figure 2:
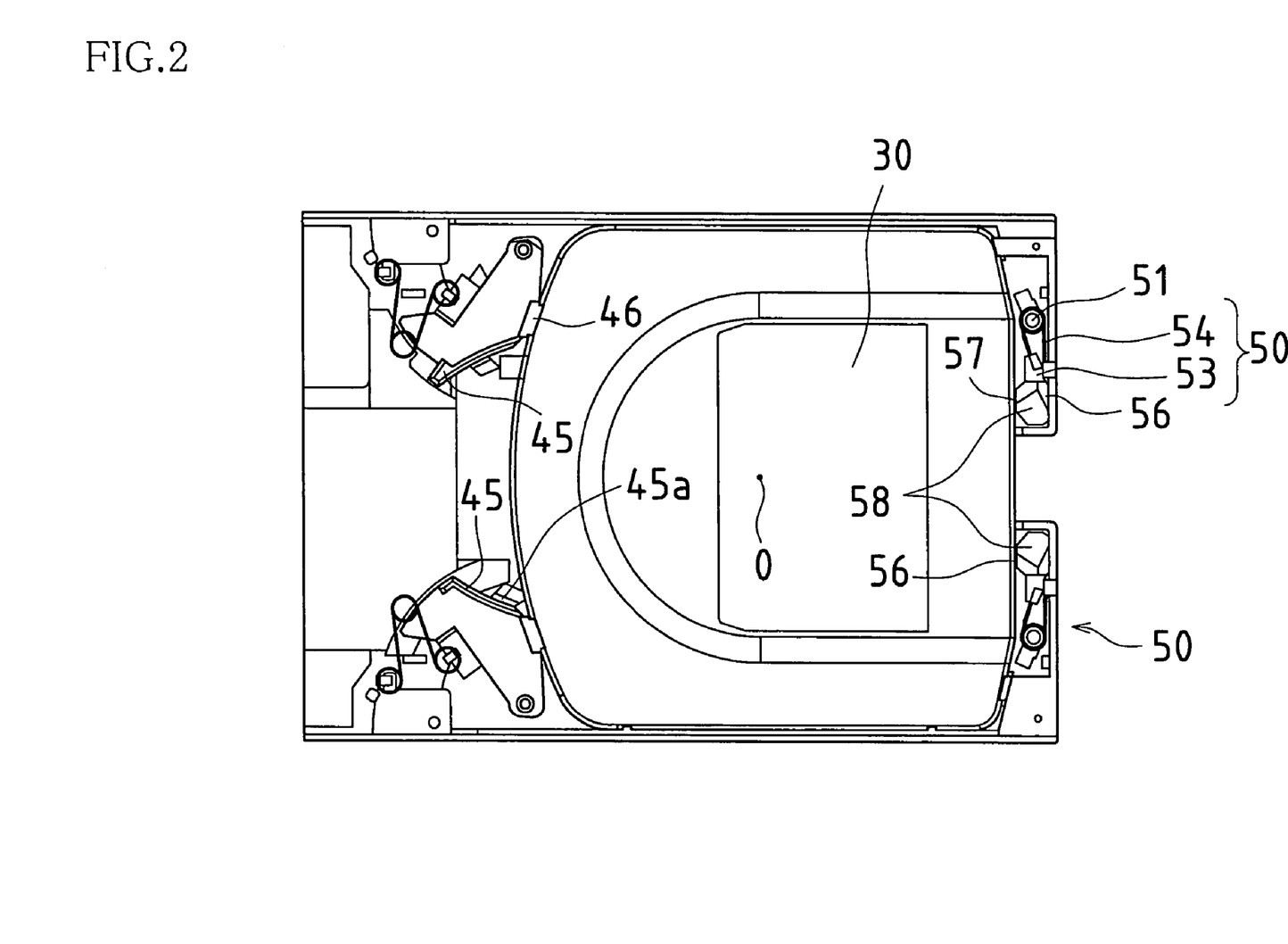
FIG. 2 is a plan view of the same tray in which a cartridge has been mounted.
Figure 3:
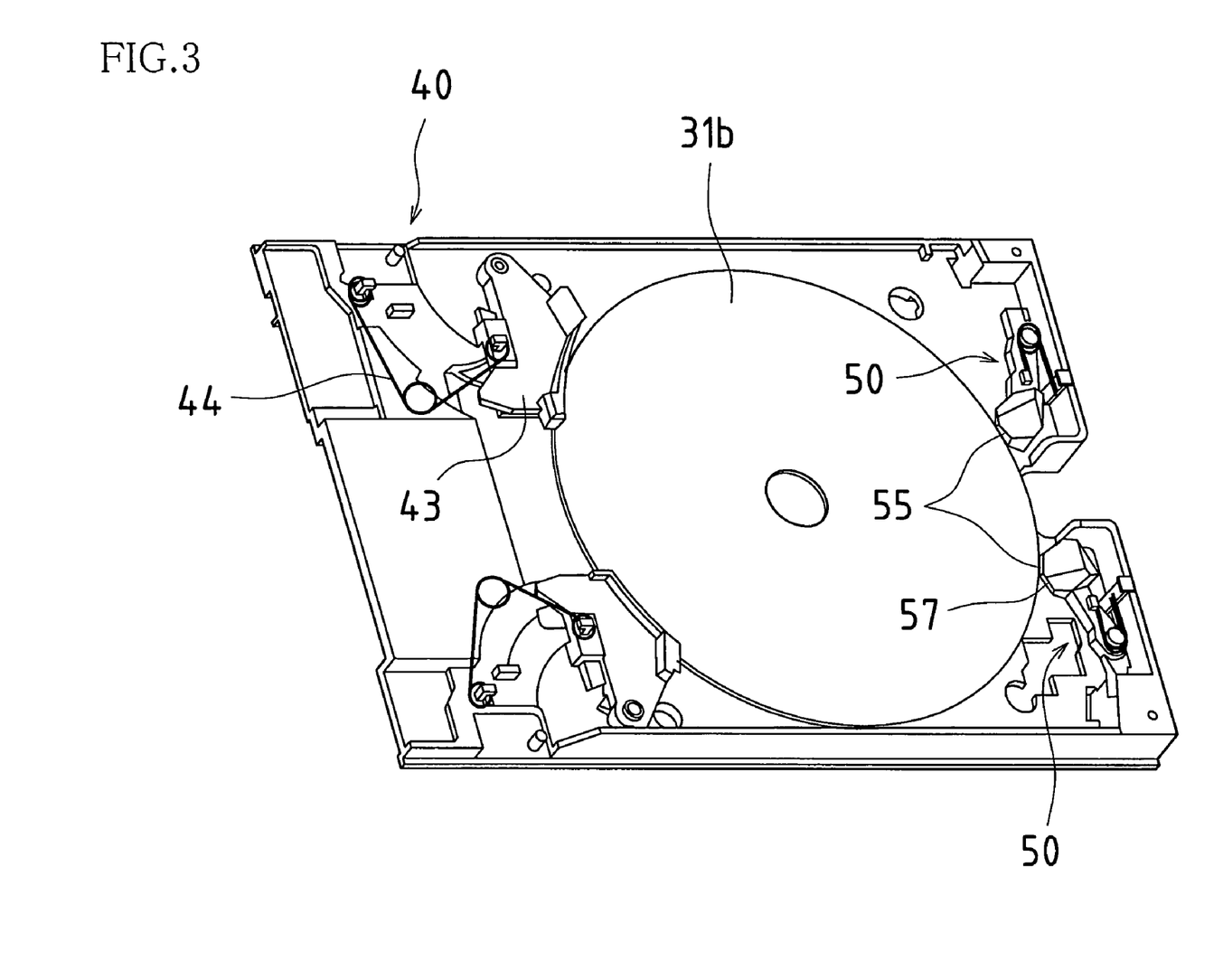
FIG. 3 is a perspective view of the same tray in which a bare disk has been mounted.
Figure 4:
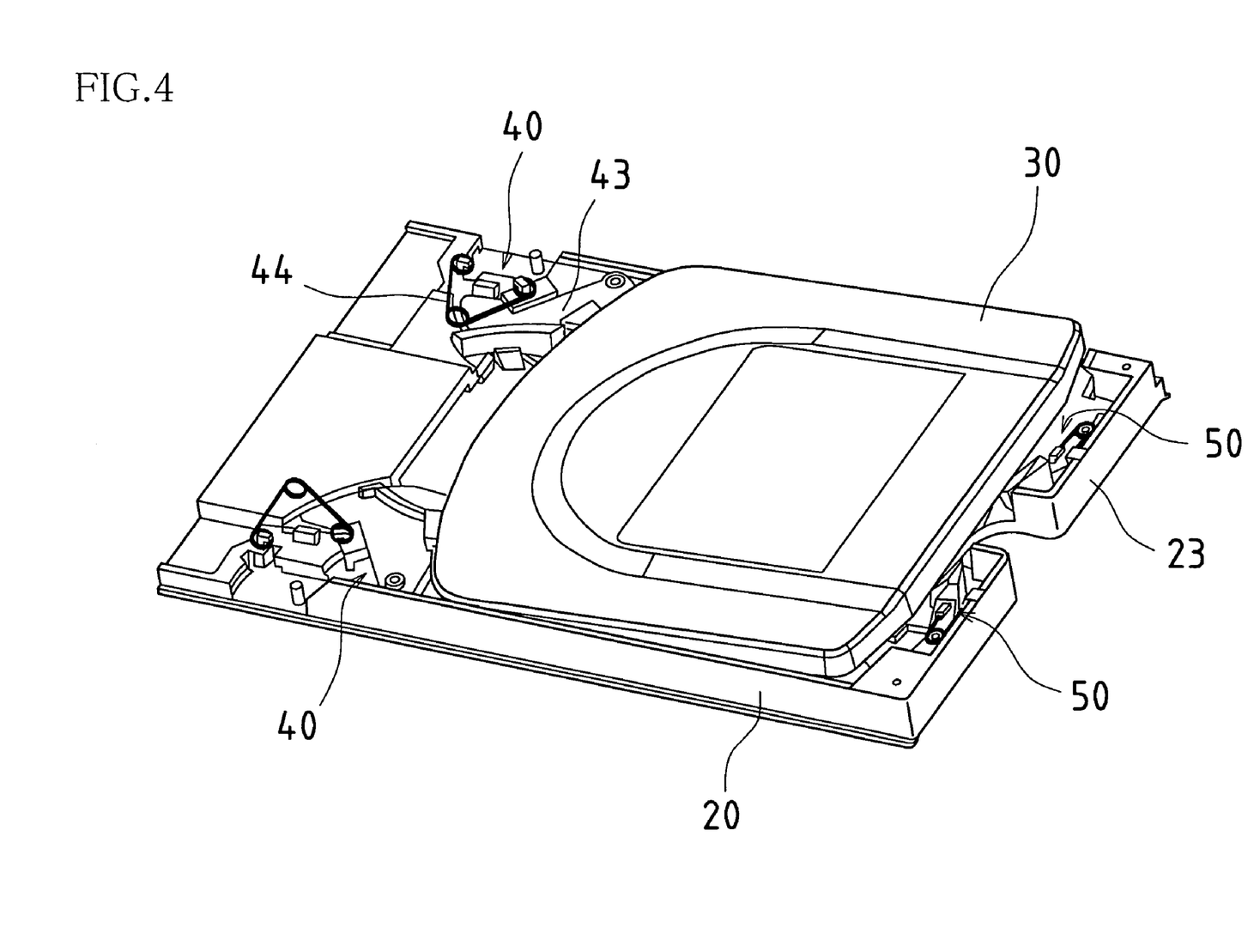
FIG. 4 is a perspective view of the same tray in which a cartridge will be mounted.
Figure 5:
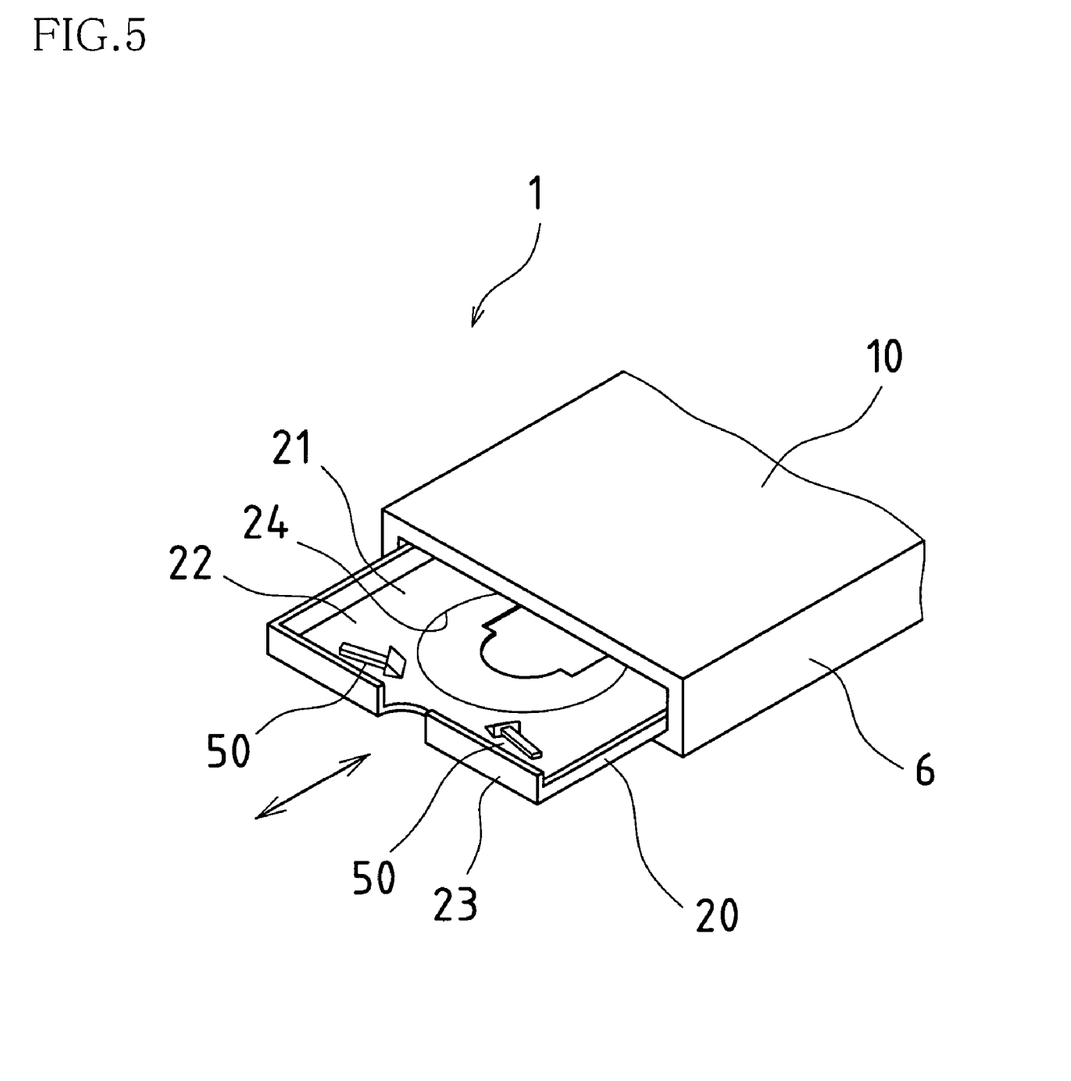
FIG. 5 is a schematic perspective view of an optical disk device according to the present invention.
Figure 6:
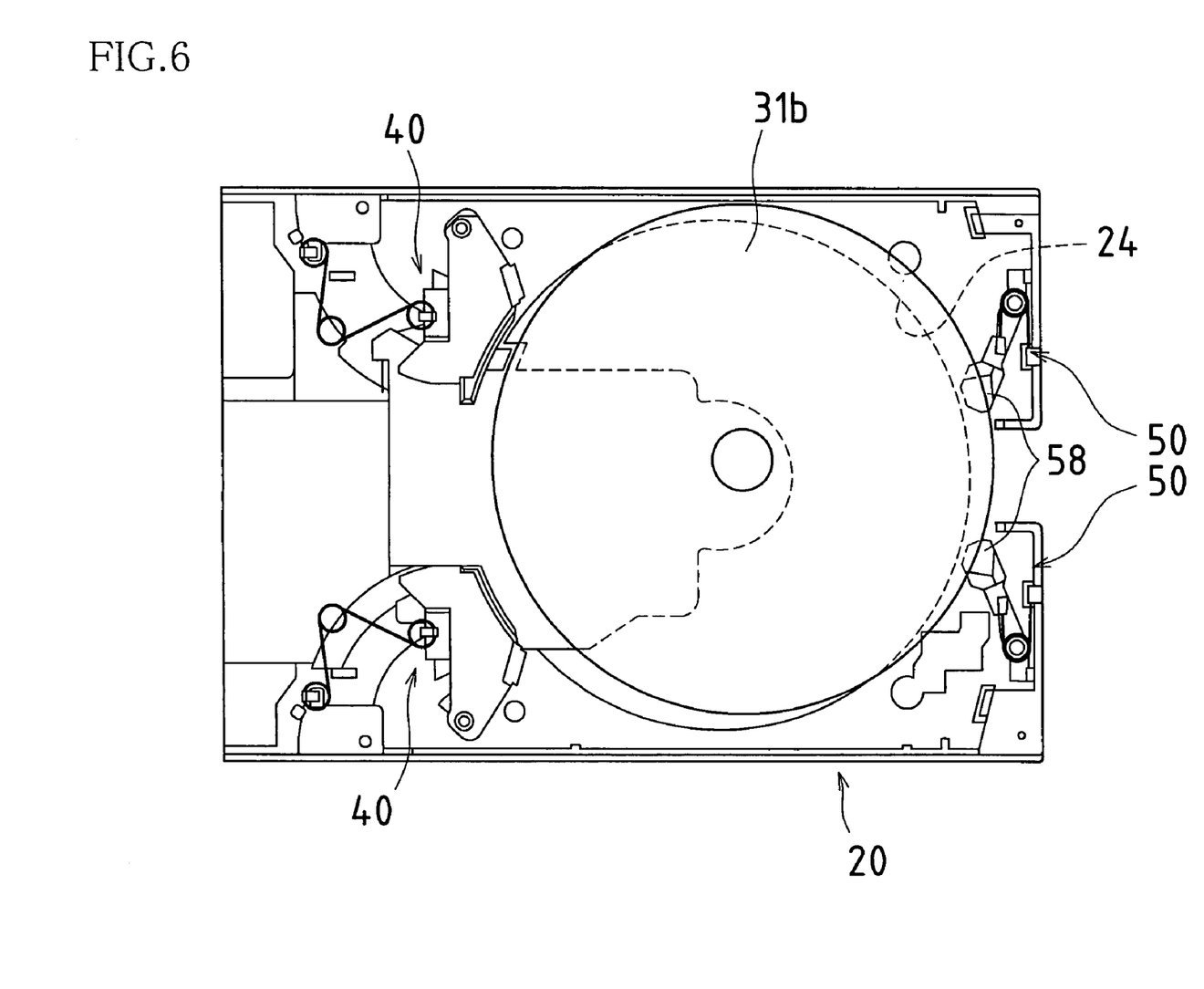
FIG. 6 is a plan view of a tray in the midst of being mounted with a bare disk that shows an embodiment of an optical disk device according to the present invention.

FIGS. 1 to 9C show an embodiment of the present invention. FIG. 1 is a plan view of a tray in which a bare disk has been mounted, FIG. 2 is a plan view of the tray in which a cartridge has been mounted, FIG. 3 is a perspective view of the tray in which a bare disk has been mounted, FIG. 4 is a perspective view of the tray in a state in which a cartridge will be mounted, and FIG. 5 is a schematic perspective view of an optical disk device.

Figure 7:
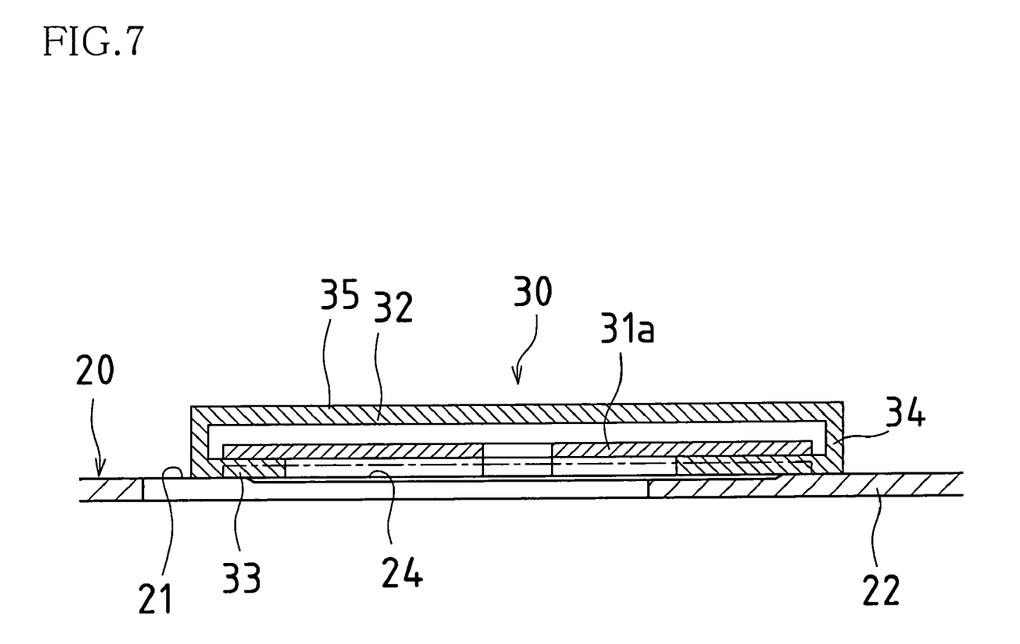
FIG. 7 is a cross-sectional diagram showing the same tray in a state in which a cartridge has been mounted into the tray.

An optical disk device 1 for recording and playback of information to and from a disk is provided with an optical disk device main body 10 and a tray 20. As shown in FIG. 8A to FIG. 9C, a turntable 5 that is rotated by a motor 3 is housed in a casing 6 in the optical disk device main body 10. As shown in FIG. 7, a cartridge 30 rotatably housed a disk 31*a* in a casing 35 that is constituted by upper and lower walls 32 and 33, and a circumferential side wall 34.

In the tray 20, a recording medium of either the cartridge 30 housing the disk 31*a* or a naked disk (a bare disk) 31*b* can be selectively mounted. The disk 31*a* of the cartridge 30 and the bare disk 31*b* are set to have the same diameter and the same thickness. Accordingly, the outer diameter of the cartridge 30 is larger than the outer diameter of the bare disk 31*b*.

The tray 20 is configured such that it can be transported to a position where recording and playback is possible by loading the cartridge 30 or the bare disk 31*b* in the optical disk device main body 10 (a recording/playback position), and a position where installation and removal of a recording medium is possible by unloading the tray 20 out of the optical disk device 1 (an installation/removal position). Also, the tray 20 is provided with a bottom wall 22 that has a face (recording medium mounting face) 21 on which the cartridge 30 or the bare disk 31*b* is mounted. A shallow circular recess 24 that has a slightly smaller diameter than the bare disk 31*b* is provided in this recording medium mounting face 21. This circular recess 24 is provided in order to prevent scratches on the signal recording face of the bare disk 31*b* when the bare disk 31*b* is mounted.

A pair of holding means 40 are provided in the front portion of the bottom wall 22 of the tray 20. Each holding means 40 is provided with a rotating body 43 as a holding member that can rotate around a support shaft 41 that is provided standing on the bottom wall 22, and a biasing means 44 that biases this rotating body 43 in a predetermined position. An elastic member can be given as an example of the biasing means 44, which here is constituted by a bar-shaped spring, one end of which is linked to the rotating body 43, and the other end of which is linked to the bottom wall 22.

The rotating body 43 includes a guide portion 45 that has a bare disk guide face 45*a* that positions the bare disk 31*b*, and a contact portion 46 that makes contact with the cartridge 30. The bare disk guide face 45*a* is formed as a recessed face along the outer periphery of the bare disk 31*b*, with an inner diameter that is somewhat larger than the diameter of the bare disk 31*b*.

Also, the rotating body 43 is made rotatable to a bare disk holding position (first holding position) where it is possible for the guide portion 45 to hold the bare disk 31*b*, and a cartridge holding position (second holding position) where it is possible for the contact portion 46 to hold the cartridge 30. The spring 44 biases the rotating body 43 so as to maintain the bare disk holding position.

A pair of holding means 50 are provided in the rear portion of the bottom wall 22 of the tray 20. Each holding means 50 includes a rotating lever 53 as a holding member that can rotate along the bottom wall 22 around a support shaft 51 that is provided standing on the bottom wall 22, and a biasing means 54 that biases this rotating lever 53 to a predetermined position. An elastic member can be given as an example of the biasing means 54, which here is constituted by a bar-shaped spring, one end of which is linked to the rotating lever 53, and the other end of which is linked to a rear wall 23 of the tray 20.

A holding portion 56 is provided in the leading edge of the rotating lever 53. A bare disk guide face 55 and a cartridge contact face 57 are provided in the holding portion 56. The bare disk guide face 55 is formed as a recessed face along the outer periphery of the bare disk 31b, with an inner diameter that is somewhat larger than the diameter of the bare disk 31b. The rotating lever 53 is made rotatable to a bare disk holding position where it is possible for the bare disk guide face 55 to hold the bare disk 31b, and to a cartridge holding position where it is possible for the cartridge contact face 57 to hold the cartridge 30. The spring 54 biases the rotating lever 53 so as to maintain the bare disk holding position.

Here, in the bare disk holding positions of the holding means 40 and the holding means 50, the bare disk guide face 45a of the guide portion 45 of the holding means 40 and the bare disk guide face 55 of the holding portion 56 of the holding means 50 are on the circumference of a circle whose center is a center of rotation O when chucking the bare disk 31b and that has a diameter that is somewhat larger than the diameter of the bare disk 31b.

An inclined face 58 that becomes lower towards the front side is formed in the top face of the holding portion 56 of the holding means 50. Also, the deformation load of the spring 54 is made larger than the weight of the bare disk 31b that acts on the inclined face 58 during mounting, and is made less than the weight of the cartridge 30. That is, the deformation load of the spring 54 is set such that with the rotating lever 53 in the bare disk holding position, when the rear portion the bare disk 31b has been placed on the inclined face 58 during mounting, the bare disk 31b can slide along the inclined face 58 and slip off due to its own weight, and with the rear portion of the cartridge 30 placed on the inclined face 58 during mounting, the cartridge 30 slides along the inclined face 58, and the cartridge 30 can be mounted by rotating the rotating lever 53 in the direction that the holding portion 56 moves in reverse.

The optical disk device 1 according to this embodiment is configured as described above. Following is a description of a usage example of the optical disk device 1.

First, when mounting the bare disk 31b in the tray 20, the tray 20 is positioned in the installation/removal position, and the bare disk 31b is placed on the recording medium mounting face 21 of the bottom wall 22 of the tray 20. When the bare disk 31b has been placed such that it is shifted a small amount to the rear of a predetermined position, the rear portion of the bare disk 31b is placed on the inclined face 58 of the holding portion 56 of the holding means 50 in the bare disk holding position (see FIG. 6, FIG. 8A, and FIG. 8B). After the rear portion of the bare disk 31b has made contact with the inclined face 58, the bare disk 31b slips off of the inclined face due to its own weight and settles into a predetermined position. Even in the case that it is temporarily difficult for the bare disk 31b to slip off, it is possible to easily slip off the bare disk 31b by lightly pushing it by hand.

Figure 8A:
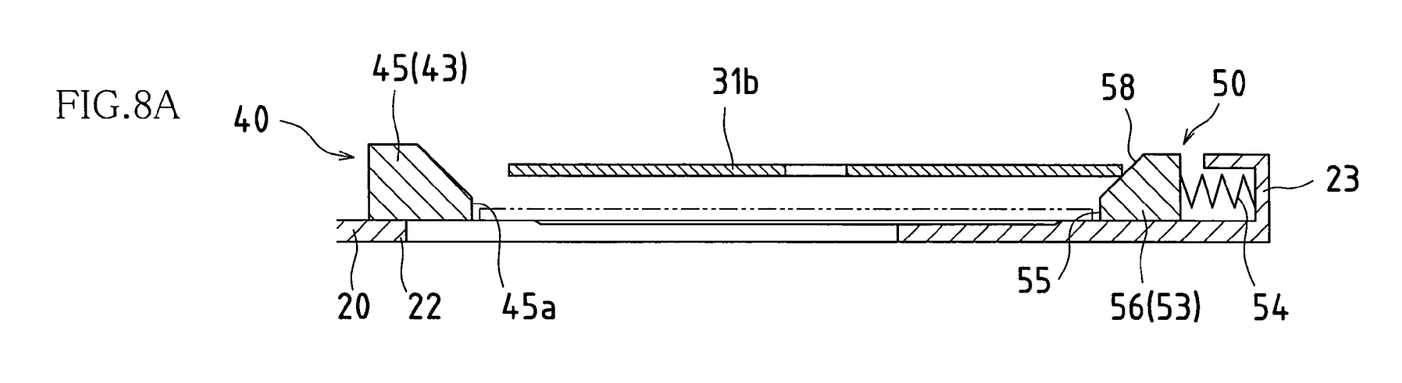
FIG. 8A is a schematic cross-sectional diagram of a case in which an attempt has been made to mount the bare disk so that it is shifted.
Figure 8B:
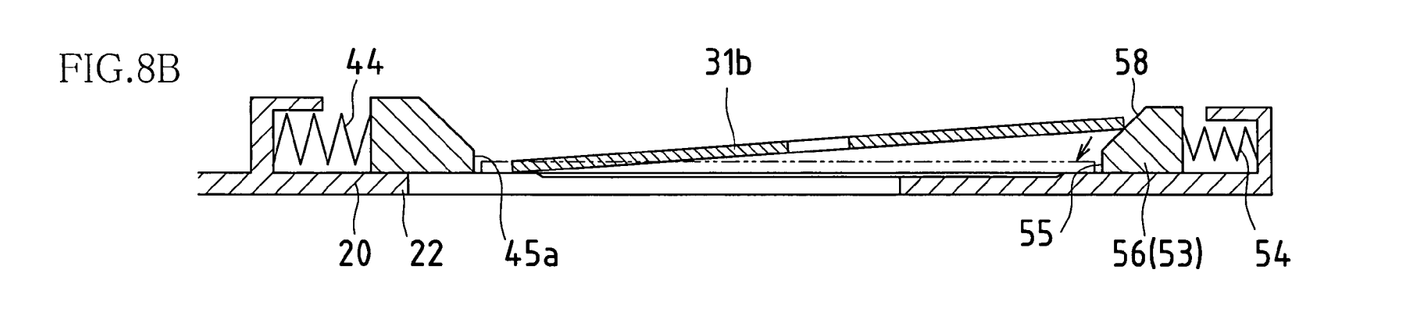
FIG. 8B is a schematic cross-sectional diagram that shows a state in which the rear portion of the bare disk has been mounted on a holding means.
Figure 8C:
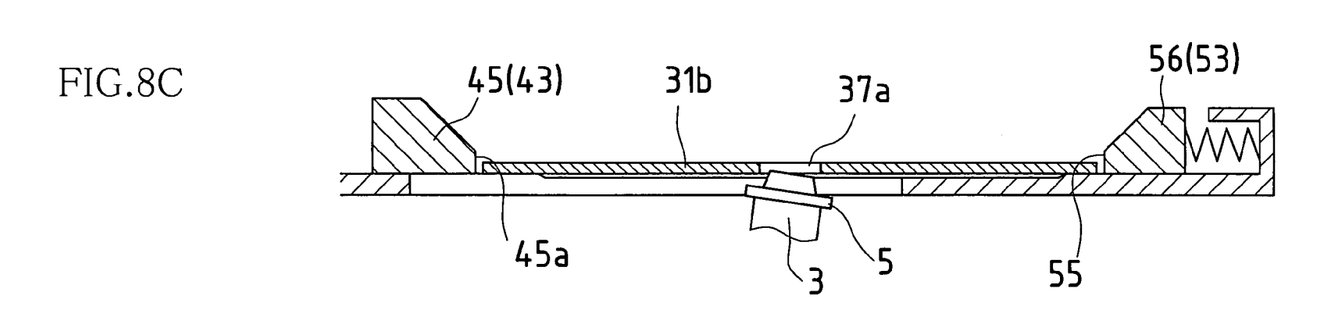
FIG. 8C is a schematic cross-sectional diagram that shows a state in which the bare disk will be chucked.

Further, as shown in FIG. 8C, after loading the tray 20 and transporting it to the recording/playback position, the bare disk 31b is reliably chucked to the turntable 5 (the turntable 5 is fitted to a hole 37a formed in the center of the bare disk 31b, and separates the bare disk 31b from the tray 20 in order to rotate the bare disk 31b).

When loading the tray 20, the holding means 40 and the holding means 50 hold the bare disk 31b without shifting it because they are in the bare disk holding positions.

When mounting the cartridge 30 in the tray 20, the tray 20 is positioned in the installation/removal position, and the cartridge 30 is pushed in forward in a state in which the leading edge of the cartridge 30 has been allowed to make contact with the holding means 40. Because the rotating body 43 of the holding means 40 is rotated around the support shaft 26 against the spring 44 to the cartridge holding position, the contact portion 46 makes contact with the leading edge of the cartridge 30, and when the near side of the cartridge 30 (the rear portion in the direction of insertion) moves downward, the rear angled portion of the cartridge 30 makes contact with the inclined face 58 of the holding portion 56 (see FIG. 9A).

With its own weight, the cartridge 30 rotates the rotating lever 53 against the spring 54, of the holding means 50 to the cartridge holding position. As a result, it is possible to mount the cartridge 30 on the cartridge mounting face 21 of the bottom wall 22 of the tray 20, the front face of the cartridge 30 is held by the contact portion 46 of the holding means 40, and the rear face is held by the holding portion 56 of the holding means 50 (see FIG. 9B). Even in the case that it is temporarily difficult to rotate the rotating lever 53 due to the weight of the cartridge 30, it is possible to easily rotate the rotating lever 53 and mount the cartridge 30 by lightly pushing the rear portion of the cartridge 30 downward by hand.

Figure 9A:
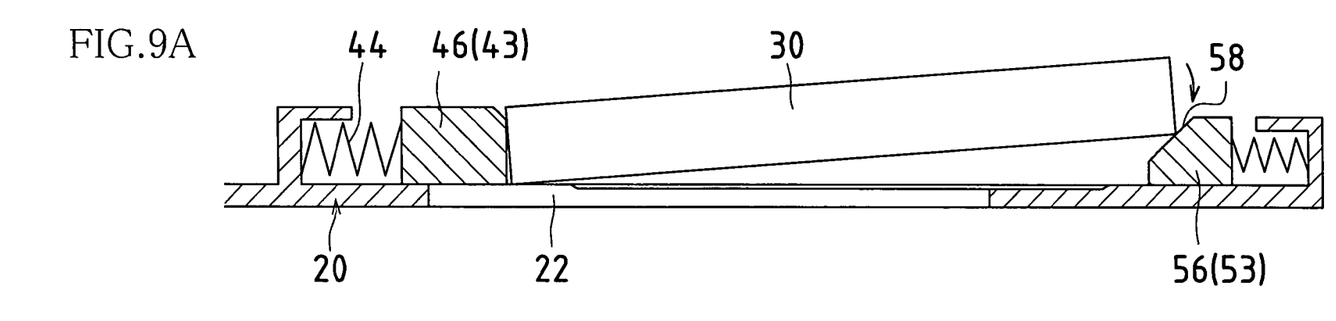
FIG. 9A is a schematic cross-sectional diagram that shows the cartridge in the midst of installation.
Figure 9B:
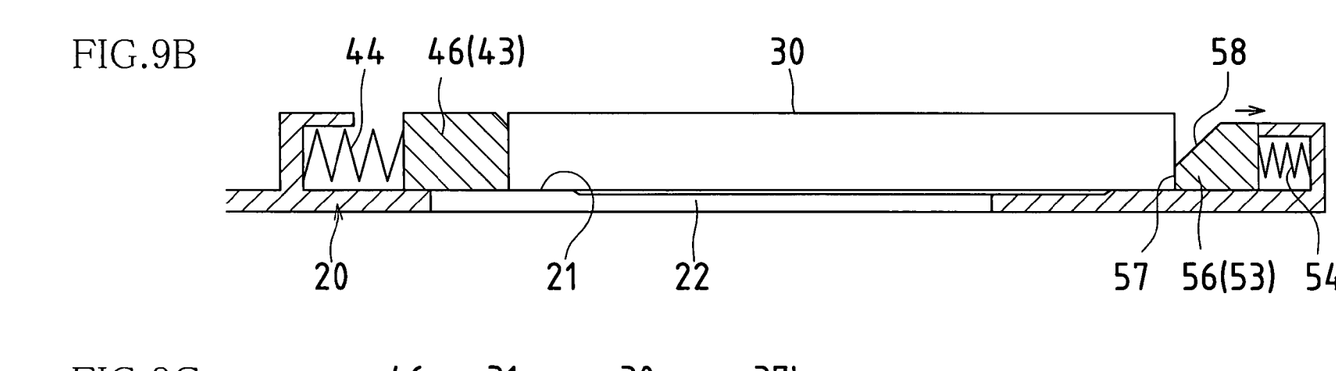
FIG. 9B is a schematic cross-sectional diagram that shows the cartridge when it is mounted. FIG. C is a schematic cross-sectional diagram that shows a state in which the cartridge will be chucked.
Figure 9C:
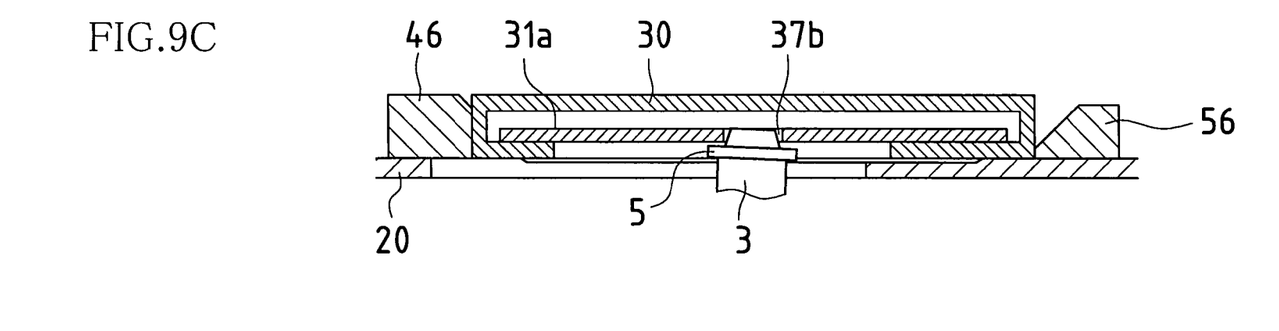

Further, by loading the tray 20, the housed disk 31a is chucked from below by the turntable 5 (see FIG. 9C). At this time the turntable 5 is fitted to a hole 37b formed in the center of the disk 31a, and separates the disk 31a from the casing 35 in order to rotate the disk 31a When removing the cartridge 30 from the tray 20, the tray 20 is unloaded and transported to the installation/removal position. When lifting up the rear portion of the cartridge 30, the cartridge 30 can be easily removed. Because the rotating body 43 of the holding means 40 and the rotating lever 53 of the holding means 50 are biased by the respective springs 44 and 54, they return to the original bare disk holding positions when the cartridge 30 is removed.

As described above, in the present embodiment, because the bare disk 31b and the cartridge 30 are mounted on the same recording medium mounting face 21 of the tray 20, it is possible to make the difference in the placement positions of the bare disk 31b and the disk 31a smaller than in the conventional technology, and the bare disk 31b and the cartridge 30 can each be accurately chucked.

Also, because the rotating body 43 of the holding means 40 and the rotating lever 53 of the holding means 50 each rotate along the bottom wall 22 of the tray 20, there is no risk that the tray 20 and the entire device will become thick.

The present invention is not restricted to the embodiment described above. For example, in the above embodiment, an example was disclosed in which the rotating body 43 of the holding means 40 and the rotating lever 53 of the holding means 50 were rotatably configured, but a configuration may also be adopted in which only either one of the holding members is rotated, and the other holding member is fixed.

Also, the bare disk 31b and the cartridge 30 were given as examples of recording mediums, but a configuration may also be adopted in which a plurality of cartridges 30 that house disks with different diameters are mounted on the tray, without mounting the bare disk 31b. In the case of such cartridges 30, in addition to using two types of cartridge, it is also possible to use a plurality of three or more types of cartridge.

The present invention may be embodied in other forms without departing from the purport or essential characteristics thereof. The embodiments disclosed in this application are to be considered in all respects as illustrative and not limiting. The scope of the invention is indicated by the appended claims rather than by the foregoing description, and all changes that come within the meaning and range of equivalency of the claims are intended to be embraced therein.

What is claimed is:

1. An optical disk device comprising:
   a tray in which either a cartridge housing a disk or a bare disk can be selectively mounted, the device being configured such that by transporting the tray into the main body of the optical disk device, the bare disk mounted in the tray or the disk in the cartridge is made to be chucked by a turntable, and
   holding means for holding the bare disk or the cartridge at a predetermined position relative to a mounting face of the tray are provided in a front portion and a rear portion of the tray respectively in the transport direction of the tray;
   wherein at least one of the holding means includes:
   a holding member that is selectively movable along the mounting surface of the tray such that the holding member can move between a bare disk holding position for holding a bare disk, and a cartridge holding position for holding a cartridge, said holding member having:
   a bare disk guide face that in said bare disk holding position extends along a diameter determined relative to a center of said turntable that is larger than an outer diameter of the bare disk, the bare disk guide face being formed approximately perpendicular to the mounting face of the tray, and
   an inclined face that inclines upward and outward from a top edge portion of the bare disk guide face such that the inclined face will be contacted by a lower angular portion of an end of the cartridge when said holding member is in the bare disk holding position and an upper angular edge of an opposite end of the cartridge engages a guide face approximately perpendicular to the mounting face of the tray of at least one other of said holding means disposed substantially opposite to said holding member, and
   biasing means that biases the holding member toward the bare disk holding position.

2. The optical disk device according to claim 1, wherein
   the at least one holding means is a holding means located in the rear portion of the optical disk device relative to a front entry portion thereof in the transport direction of the tray, and
   a biasing force of the biasing means is set such that when a rear portion of a bare disk is placed on the inclined face of the holding member, the bare disk can slide along the inclined face due to the weight of the bare disk, and when a lower rear angular portion of a cartridge is placed on the inclined face, the holding member can move diametrically outwardly along the mounting surface of the tray due to the weight of the cartridge.

* * * * *